(12) United States Patent
Mace

(10) Patent No.: US 8,074,893 B2
(45) Date of Patent: Dec. 13, 2011

(54) THERMOSTATIC CARTRIDGE WITH CONCENTRIC TEMPERATURE AND FLOW RATE CONTROLS, AND A MIXER FITTED WITH SUCH A CARTRIDGE

(75) Inventor: Christian Mace, Bruyeres le Chatel (FR)

(73) Assignee: Vernet, Ollainville (FR)

( * ) Notice: Subject to any disclaimer, the term of this patent is extended or adjusted under 35 U.S.C. 154(b) by 404 days.

(21) Appl. No.: 12/309,672

(22) PCT Filed: Aug. 2, 2007

(86) PCT No.: PCT/FR2007/001338
§ 371 (c)(1),
(2), (4) Date: Jan. 27, 2009

(87) PCT Pub. No.: WO2008/017760
PCT Pub. Date: Feb. 14, 2008

(65) Prior Publication Data
US 2009/0314844 A1 Dec. 24, 2009

(30) Foreign Application Priority Data

Aug. 3, 2006 (FR) ...................................... 06 07118

(51) Int. Cl.
*G05D 23/13* (2006.01)
(52) U.S. Cl. .................. 236/12.11; 236/12.18; 236/12.2

(58) Field of Classification Search ................. 236/12.1, 236/12.11, 12.16–12.23
See application file for complete search history.

(56) References Cited

U.S. PATENT DOCUMENTS

| 4,607,788 | A * | 8/1986 | Bendall et al. ............... 236/12.2 |
| 6,089,462 | A | 7/2000 | Osvaldo |
| 6,325,295 | B1 | 12/2001 | Lorch |
| 6,471,132 | B1 * | 10/2002 | Knapp .......................... 236/12.2 |
| 7,163,157 | B2 * | 1/2007 | Goncze et al. ............. 236/12.16 |
| 2002/0050529 | A1 * | 5/2002 | Lorch ........................ 236/12.16 |
| 2002/0130189 | A1 | 9/2002 | Mace et al. |

FOREIGN PATENT DOCUMENTS

| EP | 0936524 | 8/1999 |
| EP | 1235129 | 2/2002 |

* cited by examiner

*Primary Examiner* — Marc Norman
(74) *Attorney, Agent, or Firm* — Dowell & Dowell, PC

(57) ABSTRACT

The thermostatic cartridge (C) comprises a thermostatic assembly (2) for regulating the temperature of an outgoing mixture (F3) of incoming hot and cold fluids (F1 and F2), two ceramic disks (3, 4) for controlling the flow rates of the hot and cold fluids delivered to the thermostatic assembly, and a disk-actuating sleeve (5) receiving therein in leaktight manner the outer body (2.1) of the thermostatic assembly. To limit costs and any risk of leakage from the cartridge, the actuator sleeve is a single part that defines two internal channels (52, 53) for passing flows respectively of the hot and cold fluids from the disks to respective admission slots (2.2, 2.3) defined by the outer body of the thermostatic assembly.

11 Claims, 4 Drawing Sheets

THERMOSTATIC CARTRIDGE WITH CONCENTRIC TEMPERATURE AND FLOW RATE CONTROLS, AND A MIXER FITTED WITH SUCH A CARTRIDGE

The present invention relates to a thermostatic cartridge for a mixer tap. More specifically, it relates to thermostatic cartridges with concentric temperature and flow rate controls, i.e. cartridges that have both a first control element for setting the temperature of an outgoing fluid that results from mixing a hot incoming fluid with a cold incoming fluid, and also a second control element distinct from the first control element for setting the flow rate of the outgoing mixture, these two control elements being assembled concentrically so as to enable them to be operated respectively by causing each of them to turn about its own axis.

In practice, the temperature of the outgoing mixture is regulated by a thermostatic element, generally based on wax, while the flow rate of the outgoing mixture is frequently controlled by co-operation between two ceramic disks, each having one face in moving contact with one face of the other.

Thermostatic cartridges of this kind are presently available on the market and they can be referred to as cartridges that are "integrated" in the sense that their components are designed and assembled together specifically for the purpose of regulating both temperature and flow rate. One example of such an integrated cartridge is described in EP-A-1 235 129.

Furthermore, e.g. from EP-A-0 936 524, a thermostatic assembly is known that serves solely to control and stabilize the temperature of an outgoing mixture, without being capable of controlling the flow rate thereof. That kind of thermostatic assembly can be fitted as a single unit in a mixer tap having concentric temperature and flow rate controls by using an adapter assembly, e.g. as described in U.S. Pat. No. 6,325,195. The advantage of using a preexisting thermostatic assembly, rather than designing an integrated cartridge of the type mentioned above, is that it limits the cost of developing the cartridge, since the cartridge relies on a reliable preexisting assembly, while also limiting the unit cost of the cartridge, since the cost of fabricating the preexisting assembly is spread over several applications.

In practice, the adapter assembly in which the preexisting thermostatic assembly is arranged and held is necessary firstly to convey the hot and cold fluids for mixing to the thermostatic assembly, and secondly to provide the mechanical connection between the ceramic disks and the flow rate control element outside the main case of the cartridge. For this purpose, U.S. Pat. No. 6,325,295 proposes an adapter assembly comprising two concentric sleeves engaged one in the other, with the incoming hot and cold fluids flowing between them. Numerous sealing gaskets are required to isolate the flows of the fluids. As a result, the adapter assembly has a large number of individual parts, that are complex and expensive to assemble together, while also running major risks of leakage, given the mechanical and thermal stresses to which the adapter assembly is subjected on a repeated basis.

U.S. Pat. No. 6,089,462 proposes providing a thermostatic cartridge of simplified structure, but which corresponds to an above-mentioned cartridge that is integrated, in the sense that at least some of its components do not form a preexisting assembly that can be arranged in a plurality of applications. That cartridge serves to regulate both the temperature and the flow rate of an outgoing mixture by means of a ceramic control disk: the disk is driven to turn about its own axis relative to adjacent stationary components by a rod formed integrally with a rotary actuator sleeve in line with a peripheral portion of the sleeve. The incoming hot and cold fluids flow from the control disk to a regulator slide in respective channels that are defined by a stationary tubular body that is distinct from the above-mentioned actuator sleeve and that is made either of metal or of ceramic. Numerous gaskets are provided to seal the fluid flows, while taking account of the constraints of providing a moving assembly between the above-mentioned stationary body and rotary sleeve.

The object of the present invention is to propose a thermostatic cartridge with concentric temperature and flow rate control that not only includes an advantageously preexisting temperature regulator thermostatic assembly, but that is also inexpensive and limits any risk of leakage.

To this end, the invention provides a thermostatic cartridge with concentric temperature and flow rate controls, as defined in claim 1.

The thermostatic cartridge of the invention thus incorporates a one-piece sleeve that makes it possible firstly to limit the cost of the cartridge by limiting the cost of its components and the cost of assembling them together, and secondly to limit the risk of leakage, in particular over the entire length of the sleeve, since the sleeve on its own defines the flow channels for the hot and cold fluids. In particular, compared with an adapter assembly comprising two sleeves to be engaged one inside the other in leaktight manner, as proposed in U.S. Pat. No. 6,325,195, or else relative to a rotary actuator sleeve movably assembled on a stationary body for fluid flow to a thermostatic regulator, as proposed in U.S. Pat. No. 6,089,462, the sleeve of the cartridge of the invention requires fewer sealing gaskets and does not require any intermediate assembly prior to fitting the advantageously preexisting thermostatic assembly therein. The one-piece structure of the sleeve also guarantees a high level of mechanical reliability, thus ensuring continued mechanical linkage between the flow rate control assembly and an external control element, such as a lever.

Other characteristics of this thermostatic cartridge, taken individually or in any technically feasible combination, are specified in dependent claims 2 to 10.

The invention also provides a mixer tap, fitted with a thermostatic cartridge as defined above.

The invention can be better understood on reading the following description given purely by way of example and made with reference to the drawings, in which.

Figure 1:
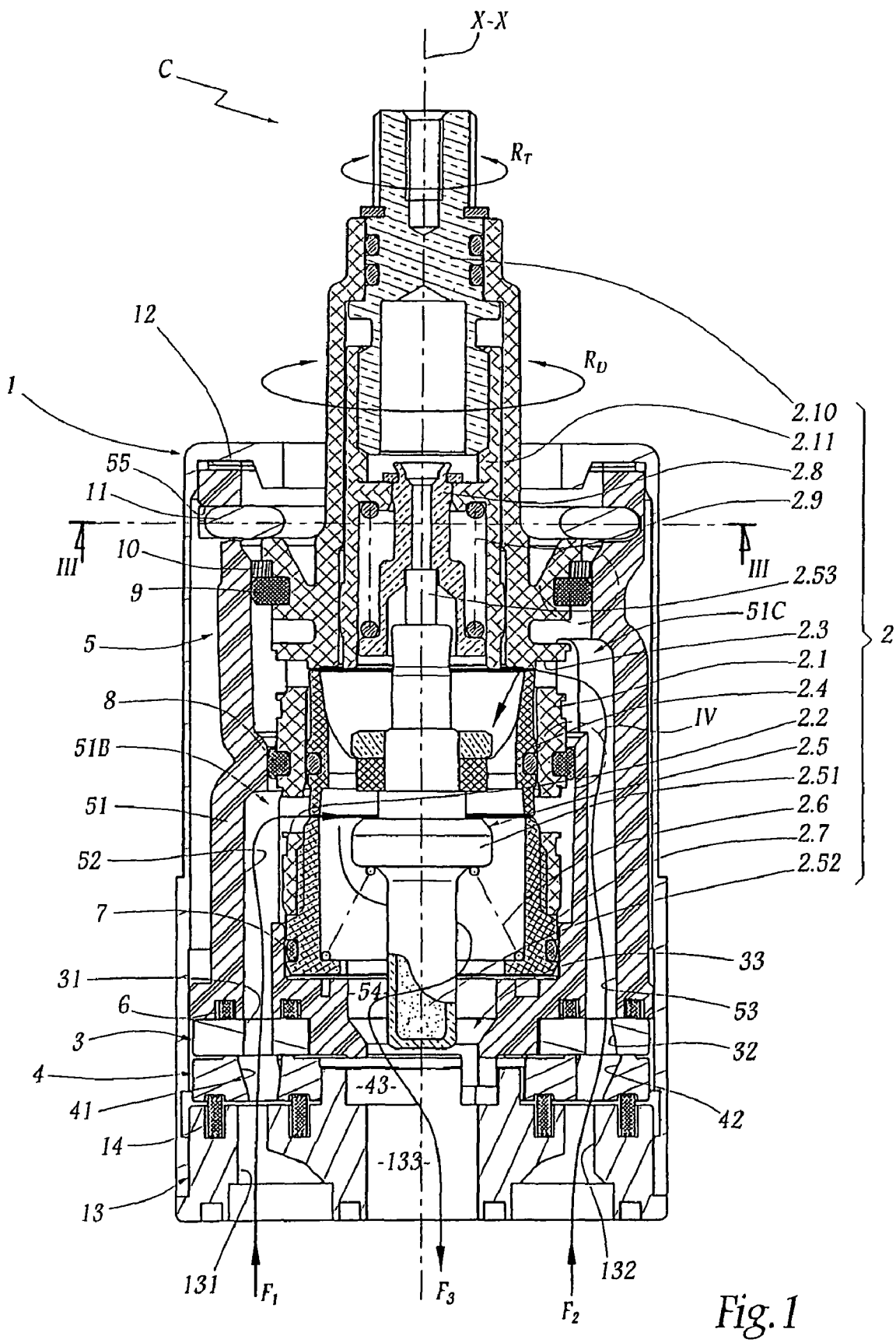
FIG. 1 is a longitudinal section of a thermostatic cartridge in accordance with the invention.
Figure 2:
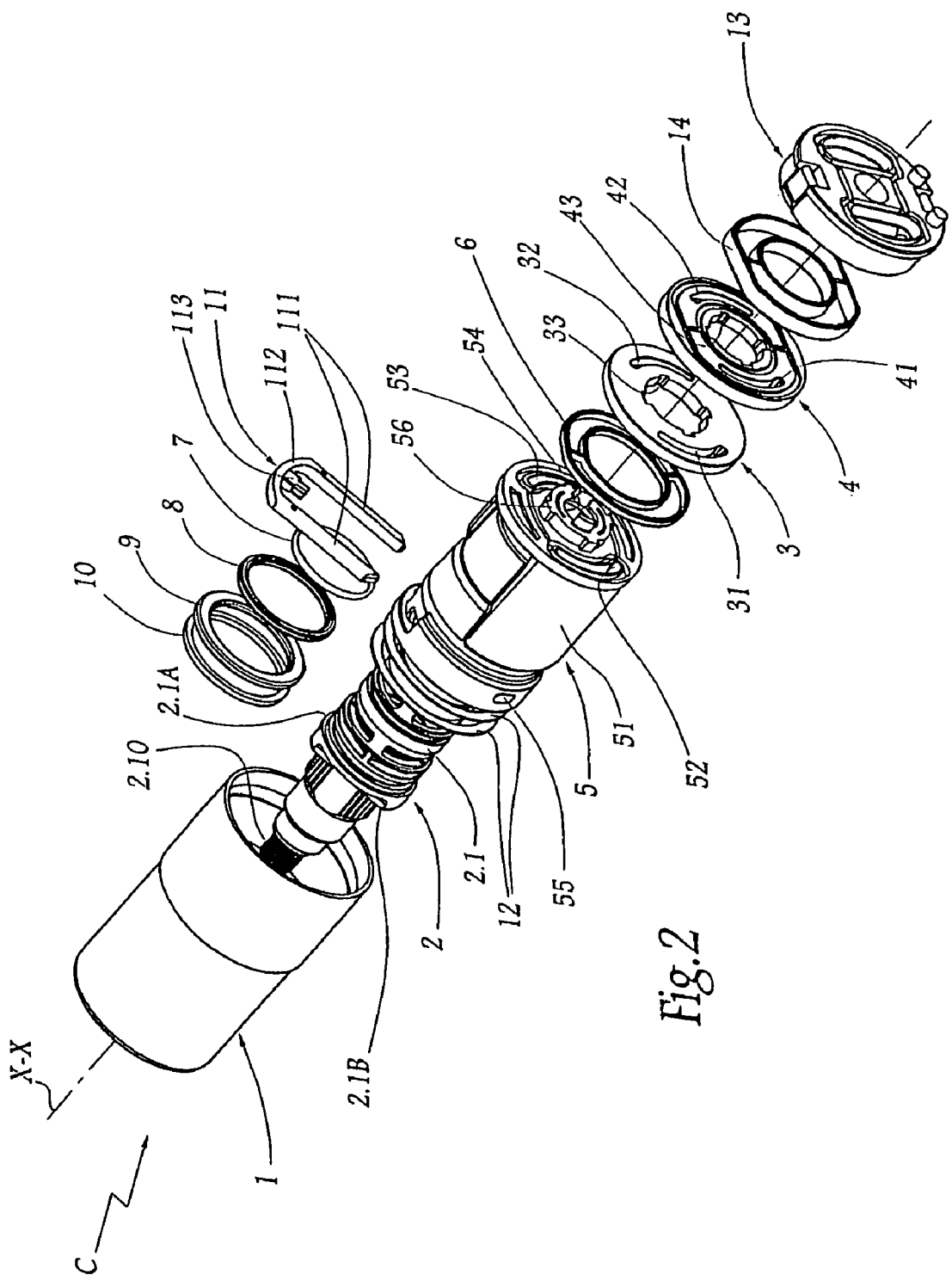
FIG. 2 is an exploded perspective view of the FIG. 1 cartridge.

FIGS. 1 and 2 show a thermostatic cartridge C for fitting to a mixer tap for a sanitary facility, such as a sink, a bathtub, a shower, etc. The cartridge is designed to be fitted inside a tap fitting body for the purpose of mixing an incoming hot fluid $F_1$, in practice hot water, with an incoming cold fluid $F_2$, in practice cold water, in order to deliver an outgoing fluid mixture $F_3$, in practice mixed water presenting a temperature lying between the temperature of the hot water and the temperature of the cold water.

The cartridge C is adapted to control in distinct manner both the temperature and the flow rate of the mixed water $F_3$, as explained progressively below.

The cartridge C essentially comprises:
- a main outer case 1;
- a thermostatic assembly 2 described in detail below and adapted to be fed with hot water $F_1$ and with cold water $F_2$, and to regulate the temperature of the mixed water $F_3$;
- a pair of ceramic disks 3 and 4 for controlling the flow rates of hot and cold water delivered to the thermostatic assembly 2, these two disks being in contact with each other via their faces in such a manner as to be movable relative to each other; and
- an elongate sleeve 5 for conveying the hot and cold water from the disks 3 and 4 to the thermostatic assembly 2, as described in detail below.

For convenience, the description below is given relative to the longitudinal direction of the sleeve 5, so that terms such as "top" and "up" designate a direction going towards the portion shown at the top in FIGS. 1 and 4, and so that terms such as "bottom" and "down" designate the opposite direction.

The thermostatic assembly 2 presents structure and function analogous to those of the thermostatic assembly described in EP-A-0 936 524. For convenience, the assembly 2 is described only briefly below, it being understood that the reader can refer to document EP-A-0 936 524 in order to find out about details and variant embodiments of said assembly.

Thus, the thermostatic assembly 2 is adapted to act independently of the flow rates of the hot water $F_1$ and of the cold water $F_2$ feeding it, to regulate the temperature of the mixture of these fluids that leaves the assembly and that constitutes the mixed water $F_3$. For this purpose, the assembly 2 comprises an elongate hollow outer body 2.1 presenting a general outside shape substantially in the form of a body of revolution about a central longitudinal axis X-X. The wall of the body 2.1 is pierced radially by at least two through lateral slots 2.2 and 2.3 through which the hot water $F_1$ and the cold water $F_2$ pass respectively from outside the body to its inside volume in order to be mixed together. These slots are offset along the axis X-X and a regulator slide 2.4 is arranged axially between these slots. The slide is mounted to slide axially inside the body 2.1 in such a manner as to form a shutter for the slots 2.2 and 2.3 as a function of its axial position, it being observed that progressively shutting one of the slots causes the other slot to be opened progressively, and vice versa. The axial position of the slide 2.4 is controlled by a thermostatic element 2.5 having a main body 2.51 that is constrained to move with the slide. The body 2.51 of the thermostatic element 2.5 is filled in part with a material 2.52 that expands with increasing temperature and that is sensitive to the temperature of the mixed water $F_3$ in which the portion of the body 2.51 containing said material is immersed. Under the effect of the material 2.52 expanding, a piston 2.53 of the thermostatic element 2.5 moves in translation along the axis X-X relative to the body 2.51. In practice, ignoring setting operations explained below, the axial position of the piston 2.53 is stationary relative to the outer body 2.1, such that any change in the temperature of the mixed water $F_3$ leads to relative movement of the body 2.51 of the thermostatic element, and thus to movement of the slide 2.4 in translation relative to the body 2.1. The thermostatic element 2.5 is associated with a return spring 2.6 interposed between the body 2.51 and a stationary stop 2.7 that is screwed to the bottom axial end of the body 2.1. The top end of the piston 2.53 bears against an over-stroke endpiece 2.8 associated with an over-stroke spring 2.9.

To enable the axial position of the top end of the piston to be adjusted relative to the body 2.1, the assembly 2 includes firstly an adjustment screw 2.10 centered on the axis X-X and having its top end extending outside the body 2.1, and secondly an adjustment nut 2.11.

In operation, when hot water $F_1$ is feeding the slot 2.2 and cold water $F_2$ is feeding the slot 2.3, the mixed water $F_3$ flows downstream from the slide 2.4 along the temperature-sensitive portion of the body 2.51 of the thermostatic element 2.5. If the temperature of the mixed water increases, then the thermostatic element expands and the slide 2.4 that is constrained to move therewith progressively shuts the slot 2.2 and progressively opens the slot 2.3. This results in a reduction in the temperature of the mixed water by modifying the ratio of the flow rates of the hot and cold water admitted to the inside of the body 2.1. An opposite operation occurs when the temperature of the mixed water decreases. These corrections of the temperature of the mixed water by the thermostatic element balance each other out, causing said temperature to become stabilized on a value that depends on the axial altitude of the piston 2.53. The user selects the temperature for the mixed water $F_3$, i.e. adjusts this temperature, by a turning $R_T$ of the screw 2.10 about the axis X-X, thereby acting via the screw thread to move the nut 2.11 in axial translation. So long as the regulator slide 2.4 does not completely shut off the hot water slot 2.2, i.e. so long as the slide is not bearing in leaktight manner against the screw-on stop 2.7, the nut 2.11 entrains the over-stroke endpiece 2.8 in corresponding manner, since the piston 2.53 of the thermostatic element 2.5 is pressed thereagainst under drive from the spring 2.6, thereby modifying the altitude of the piston.

Furthermore, if the cold water is shut off, the thermostatic element 2.5 is responsive solely to the hot water: the piston 2.53 then moves over a considerable distance relative to the body 2.51 so that the regulator slide 2.4 moves in translation until it comes to bear in leaktight manner against the screw-on stop 2.7, and then, where appropriate, the over-stroke endpiece 2.8 compresses the over-stroke spring 2.9. This results in automatic closure of the hot water slot 2.2, thus avoiding any risk of scalding. In other words, the thermostatic assembly 2 incorporates an anti-scalding safety function.

It will be understood from the above, and from the embodiment details given in EP-A-0 936 524, that the thermostatic assembly 2 serves on its own to regulate the temperature of the mixed water $F_3$, i.e. regulation is performed independently of the other components of the cartridge C. In practice, this thermostatic assembly 2 is advantageously a preexisting assembly that is assembled with other components such as the outer case 1, the control disks 3 and 4, and the sleeve 5 in order to obtain the thermostatic cartridge C, as explained below.

Figure 3:
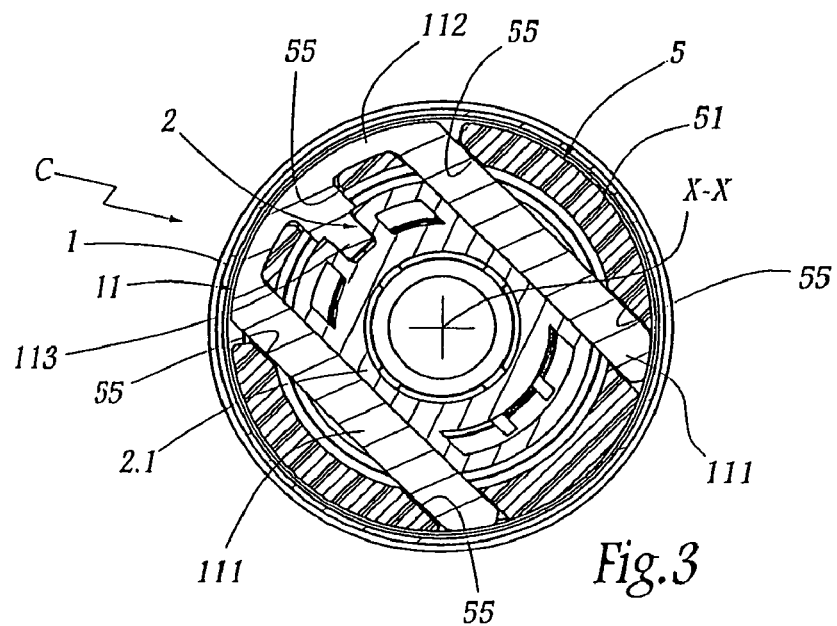
FIG. 3 is a cross-section of the cartridge on line III-III of FIG. 1.
Figure 4:
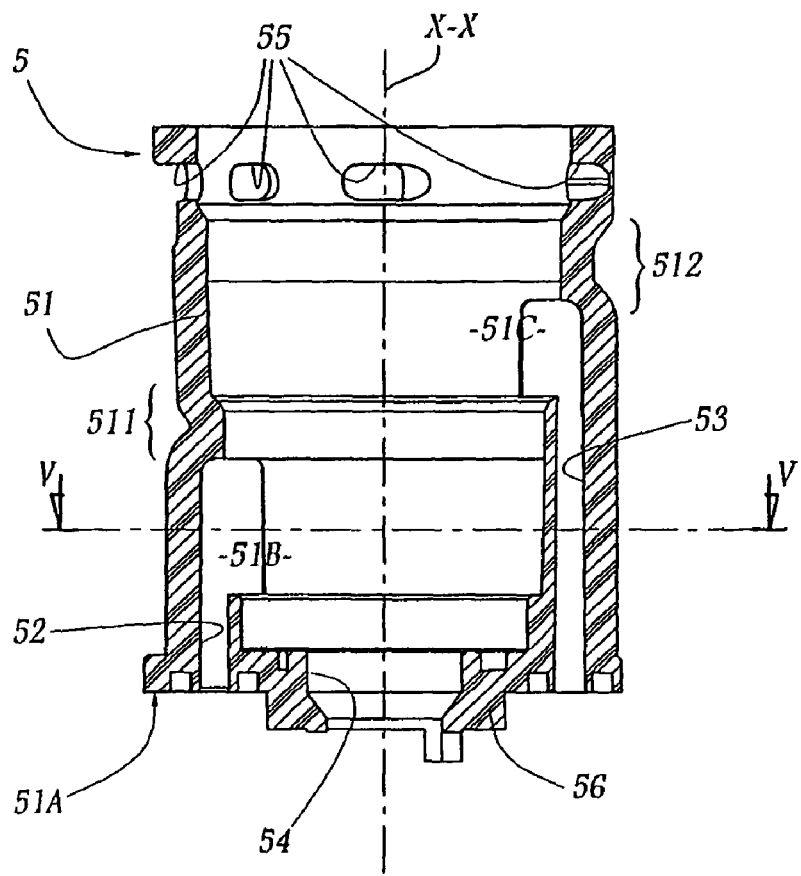
FIG. 4 is a section analogous to FIG. 1 in which a sleeve of the cartridge is shown on its own.
Figure 5:
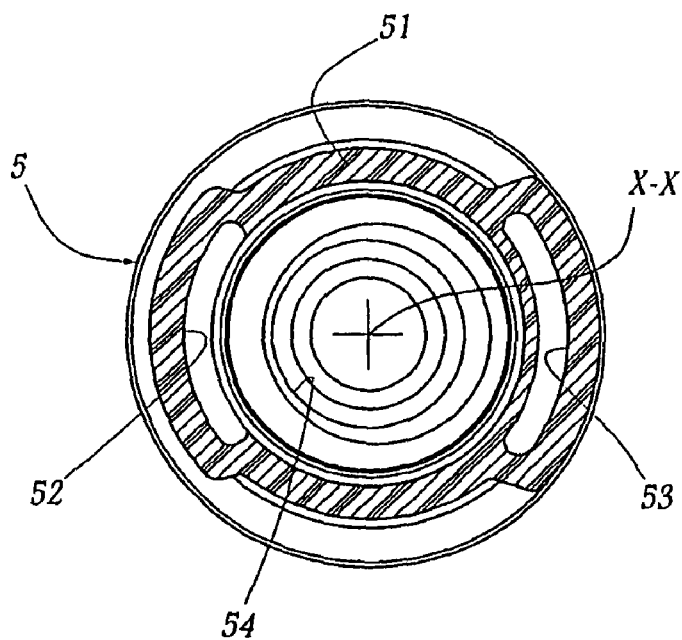
FIG. 5 is a section on line V-V of FIG. 4.

As shown in greater detail in FIGS. 3 to 5, the sleeve 5 is generally tubular in shape, being substantially centered on the axis X-X. The side wall 51 of the sleeve is made as a single part and in its bottom portion it defines three fluid flow channels, as can be seen clearly in FIG. 5. Thus, the wall 51 defines in its thickness a first channel 52 extending along the longitudinal direction of the sleeve from the bottom axial end face 51A of the wall 51 to an outlet zone 51B where it opens out radially into the inside volume of the sleeve, as can be seen in the left-hand portion of FIG. 4. Along the periphery of the sleeve, this first channel 52 occupies about one-fourth of the sleeve, plus or minus 15%.

Diametrically opposite the first channel 52, the wall 51 defines, within its thickness, a second channel 53 that extends in the longitudinal direction of the sleeve from the end face 51A to an outlet zone 51C where it opens out radially into the inside volume of the sleeve, as shown in the right-hand portion of FIG. 4. This outlet zone 51C is axially offset relative to the outlet zone 51B of the channel 52, being separated therefrom by a corresponding axial portion 511 of the wall 51, which portion forms an internal shoulder overlying the zone 51B. Around the periphery of the sleeve 5, the second channel 53 occupies approximately one-fourth of the sleeve, plus or minus 15%.

In addition, the wall 51 defines internally, in circumferential manner, a third channel 54 that is generally centered on the axis X-X. This channel 54 axially connects the bottom face 51A with the inside volume of the sleeve, opening out into said inside volume axially level with the outlet zone 51B of the channel 52.

In its top end portion, the side wall 51 of the sleeve 5 is provided with a plurality of orifices 53 passing radially through said wall. These orifices lie generally in a common plane that is substantially perpendicular to the axis X-X, being situated axially above the outlet zone 51C of the second channel 53, and being separated therefrom by a corresponding axial portion 512 of the wall 51 that forms an internal shoulder overlying the outlet zone 51C. The relative positions of the orifices 55 and their function are described below.

When the cartridge C is in the assembled state, the bottom end face 51A of the sleeve 5 bears against the top face of top disk 3 in centered manner about the axis X-X, with these two parts being constrained to turn together about the axis X-X. As shown in FIGS. 1 and 2, the disk 3 defines three fluid passages passing through the thickness of the disk, i.e. a hot water passage 31, a cold water passage 32, and a mixed water passage 33. The bottom axial ends of the channels 52, 53, and 54 in the sleeve open out directly along respective directions that are substantially parallel to the axis X-X respectively into these passages 31, 32, and 33, it being observed that the wall defining the passage 33 is designed to be complementary to a crenellated flange 56 surrounding the outlet of the central channel 54 (FIG. 2) for providing a rotary connection between the sleeve and the disk 3. In order to ensure leaktightness between the flows of hot water, cold water, and mixed water both relative to the outside and relative to one another, a compression gasket 6 is interposed axially between the sleeve and the disk 3. This shaped gasket is advantageously received in a corresponding indentation formed in the end face 51A of the sleeve.

Also in the assembled state of the cartridge C, the thermostatic assembly 2 is received in leaktight manner inside the sleeve 5. More precisely, as shown in FIG. 1, the screwed-on stop 2.7 is housed in the top portion of the central channel 54, being shouldered in a manner that is substantially complementary to said stop and having a bottom gasket 7 interposed between them, such as a conventional O-ring, while the bottom portion of the outer body 2.1 is housed in the remainder of the inside volume of the sleeve, with an intermediate gasket 8 and a top gasket 9 being interposed therebetween. In this assembled configuration, the slot 2.1 lies in the outlet zone 51B of the channel 52, while the slot 2.3 lies in the outlet zone 51C of the channel 53. It can thus be understood that the channels 52 and 53, that are located in the thickness of the wall 51 of the sleeve, and that are thus without risk of leakage along said channels, serve to convey respective flows of hot water $F_1$ and cold water $F_2$ from the disk 3 as far as the slots 2.1 and 2.3 respectively.

Simultaneously, the mixed water $F_3$ leaving the thermostatic assembly 2 feeds the central channel 54 in which the bottom end of the body 2.51 of the thermostatic element 2.5 extends.

The gasket 7 thus seals the flow of hot water $F_1$ from the flow of mixed water $F_3$ between the stop 2.7 and the sleeve 5.

Figure 6:
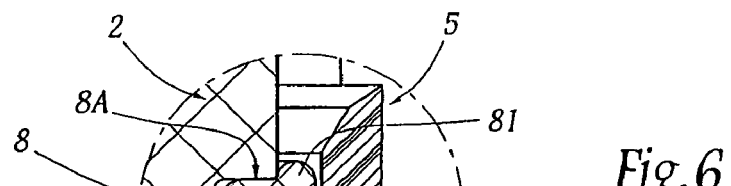
FIGS. 6 and 7 are views on a larger scale respectively of details in circles VI and VII in FIG. 1.

The gasket 8 serves to seal the flow of hot water $F_1$ from the cold water $F_2$ between the outer body 2.1 and the wall portion 511. In practice, the gasket 8 is a gasket that is special in the sense that it has a cross-section that is substantially rectangular, as shown in greater detail in FIG. 6, with bottom and top faces 8A and 8B, each of which has a respective downward or upward peripheral bulge 81, 82 projecting therefrom. The gasket 8 is housed in an associated peripheral groove formed in the outer face of the body 2.1, such that the bulges 81 and 82 occupy the radial clearance $j_1$ between the body 2.1 and the wall portion 511. The special shape of the gasket 8 gives it excellent performance under pressure, by limiting any risk of the gasket being extruded: since this gasket is subjected to the pressure difference between the hot water and the cold water, any failure thereof would lead to hot water leaking in the event of the cold water being cut off, with consequent major risk of scalding. This ability to withstand pressure is provided even when the value of the clearance $j_1$ is greater than the maximum value that could be accommodated by a conventional O-ring.

Figure 7:
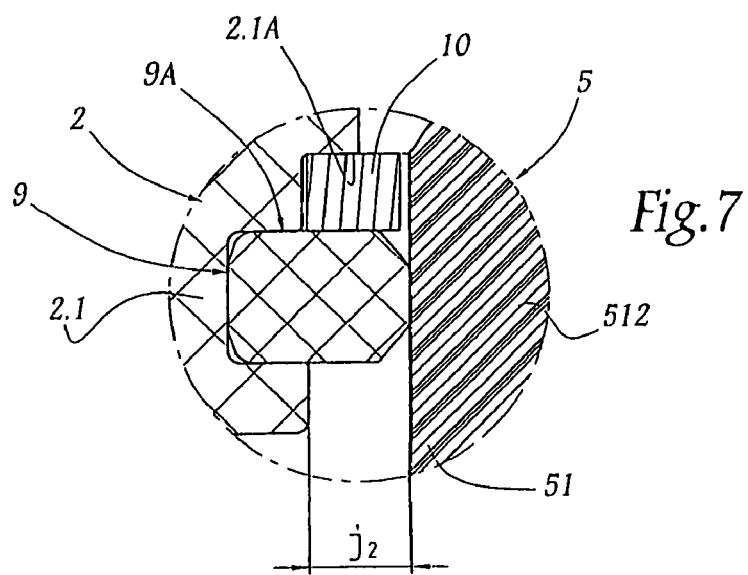

The gasket 9 serves to seal the cold water from the outside between the body 2.1 and the wall portion 512. In practice, the gasket 9, as shown in greater detail in FIG. 7, is a gasket that is special, in the sense that firstly it presents a cross-section that is generally rectangular, fitting in a corresponding peripheral groove formed in the outer face of the body 2.1, and that secondly it is associated with an axial retention washer 10 jammed axially between the top face 9A of the gasket 9 and a corresponding shoulder 2.1A of the body 2.1. The outside diameter of the washer 10 is substantially equal to the inside diameter of the wall portion 5.12, such that the washer centers the thermostatic assembly 2 in the sleeve 5, while occupying the radial clearance $j_2$ between the outer body 2.1 and the wall portion 512 immediately above the face 9A of the gasket 9. As a result, the washer 10 prevents the gasket 9 being extruded into the clearance $j_2$: such a failure of the gasket would lead to cold water leaking to the outside, and to a corresponding risk of flooding. Associating the gasket 9 with the washer 10 thus serves to seal the clearance $j_2$ effectively, even for values of this clearance that are greater than the maximum value of clearance that could be accommodated by a conventional O-ring.

When the cartridge C is in the assembled state, the sleeve 5 is mechanically linked to the outer body 2.1 of the thermostatic assembly 2 via a rigid fork 11 that can be seen clearly in FIGS. 2 and 3. This fork has two parallel arms 111 that define a plane substantially perpendicular to the axis X-X and that are connected together at one end via an annular portion 112 that is substantially centered on the axis X-X. As shown in FIG. 3, each arm 111 is received in two of the associated orifices 55, while an internal stud 113 secured to the portion 112 is received in the fifth orifice 55. The radial spacing between the arms 111 is designed to fit against two opposite flats 2.1B of the body 2.1. Thus, the fork 11 serves on its own to retain the thermostatic assembly 2 axially within the sleeve 5, at least in an upward direction, by means of the bottoms of the flats 2.1B bearing axially against the bottom faces of the arms 111, and it also serves to constrain the sleeve in rotation with the outer body 2.1 about the axis X-X by means of the flats 2.1B pressing against the facing faces of the arms 111.

The outer case 1, made of metal or of plastics material, surrounds the outside of the entire sleeve 5 and holds it axially via a top end flange, with two sliding washers 12 being interposed, in particular washers made of a plastics material presenting a low coefficient of friction, e.g. made of polytetrafluoroethylene (PTFE). In its bottom end portion, the case 1 is securely assembled to a base 13, e.g. made of plastics material, that enables the cartridge C to be connected to the inlets for hot and cold water and to the mixed water outlet of a tap, respectively via a hot water passage 131, a cold water passage 132, and a mixed water passage 133, all of which pass axially through the base. The top face of the base is pressed against the bottom face of the bottom disk 4 in centered manner against the axis X-X, and these two parts are constrained to rotate with each other about the axis X-X. The disk 4 defines simultaneously a hot water passage 41, a cold water passage 42, and a mixed water passage 43, all of which pass axially through the disk and that open out beside the base into respective ones of the passages 131, 132, and 133, it being observed that the wall defining the passage 43 is designed to be complementary to a crenellated flange surrounding the outlet of the passage 133 (not visible in FIG. 2) in order to constrain the base in rotation with the disk 4. A compression gasket 14 is interposed axially between the base 13 and the disk 4, this gasket sealing the hot, cold, and mixed water flows from the outside and from one another. The gasket 14 is advantageously received in a corresponding indentation formed in the top face of the base.

In operation, the hot water $F_1$ enters the cartridge C via the passage 131 in the base 13, passes successively along the passage 41 in the disk 4 and the passage 31 in the disk 3, flows in the channel 52 of the sleeve 5, passes through the slot 2.2, and penetrates into the slide 2.4. Simultaneously, the cold water $F_2$ enters into the cartridge via the passage 132 in the base 13, passes successively through the passage 42 in the disk 4 and the passage 32 in the disk 3, flows in the channel 53, passes through the slot 2.3, and then mixes with the hot water in the slide 2.4. The mixed water leaves the slide by passing through the return spring 2.6 around the temperature-sensitive portion of the thermostatic element 2.5, and then passes successively via the channel 54 in the sleeve 5, the passage 33 in the disk 3, the passage 43 in the disk 4, and the passage 133 in the base 13, thereby finally reaching the outlet from the tap.

The flow rate of the mixed water $F_3$ is adjusted by a turning $R_D$ of the body 2.1 about the axis X-X, thereby turning the fork 11, which in turn turns the sleeve 5, which in turn turns the disk 3 relative to the stationary disk 4. The angular position of the moving disk 3 relative to the stationary disk 4 defines the flow section for hot water that results from the junction between the passages 31 and 41, and also defines the flow section for cold water that results from the junction between the passages 32 and 42. The shapes of these passages are designed so that the flow sections for hot water and for cold water are equal to each other regardless of the relative angular position between the two disks, with adjustment ranging from completely closed to fully open.

In order to fabricate the cartridge C, the thermostatic assembly 2 is available in a preassembled configuration as shown in FIG. 2, and the other components of the cartridge C are also available, in particular the case 1, the disks 3 and 4, the sleeve 5. Advantageously, the sleeve is obtained by injection-molding a plastics material: in order to make the channels 52 and 53 in the thickness of the wall 51, which channels open out into the inside volume of the sleeve, but do not open out to the outside of the sleeve, these channels are obtained using molding pins that are unmolded downwards, while a central pin is used together therewith for molding the inside face of the wall 51, in particular in the central channel 54 and the wall portions 511 and 512. The use of these pins implies dimensional differences between the maximum inside diameter of the channel 54, the inside diameter of the wall portion 511, and the inside diameter of the wall portion 512. These dimensional differences give rise to the above-mentioned clearances $j_1$ and $j_2$ that are sealed by the special gaskets 8 and 9 when the cartridge C is in its assembled state, as explained above.

In order to assemble the components of the cartridge C, the thermostatic assembly 2 is fitted inside the sleeve 5 by passing through its top end. The fork 11 can then be fitted transversely relative to the sleeve so as to connect the sleeve to the outer body 2.1 of the assembly 2. In parallel, the disks 3 and 4 and the base 13 are fitted to the bottom end of the sleeve 5, and then the case 1 is used to hold these components relative to one another.

Various arrangements and variants of the above-described cartridge C can also be envisaged. As examples:
 the peripheral dimensions of the channels 52 and 53 of the sleeve 5 are not restricted to one-fourth of the sleeve. In particular, they may be as great as substantially half the periphery of the sleeve for use with high flow rate cartridges; and/or
 control assemblies other than the assembly comprising the disks 3 and 4 can be used in the bottom portion of the cartridge, providing said assemblies allow the channels 52 and 53 to be fed with hot fluid and cold fluid, while still being actuatable by turning the sleeve for flow rate control purposes.

The invention claimed is:

1. A thermostatic cartridge with concentric temperature and flow rate controls, the cartridge comprising:
 a thermostatic assembly for regulating the temperature of an outgoing mixture of incoming hot and cold fluids, said thermostatic assembly comprising an outer body that defines first and second admission slots respectively for the hot and cold fluids;
 a control assembly for controlling the flow rates of the hot and cold fluids sent to the first and second slots; and
 an actuator sleeve for actuating the control assembly, the actuator sleeve receiving in leaktight manner at least a portion of the outer body of the thermostatic assembly;
 wherein the actuator sleeve is a single part that defines both a first internal channel for passing a flow of the hot fluid from the control assembly to the first slot, and a second internal channel for passing a flow of the cold fluid from the control assembly to the second slot.

2. A cartridge according to claim 1, wherein the actuator sleeve is made of an injection-molded plastics material.

3. A cartridge according to claim 1, wherein each of the first and second channels occupies about one-fourth of the periphery of the actuator sleeve.

4. A cartridge according to claim 1, wherein each of the first and second channels extends over about one-half of the periphery of the actuator sleeve.

5. A cartridge according to claim 1, wherein the cartridge further includes a fork providing a mechanical connection between the outer body of the thermostatic assembly and the actuator sleeve, the fork being adapted both to retain the outer body inside the actuator sleeve along the longitudinal direction thereof, and to constrain the outer body in rotation with the actuator sleeve about a central longitudinal axis of the actuator sleeve.

6. A cartridge according to claim 5, wherein the fork has at least two arms that lie in a plane substantially perpendicular to the longitudinal direction of the actuator sleeve, that are received in associated orifices defined by the actuator sleeve, and that co-operate by means of complementary shapes with flats defined by the outer body of the thermostatic assembly.

7. A cartridge according to claim 1, wherein, at the zone where the first channel opens out into the inside volume of the actuator sleeve, the first channel is sealed by a first gasket interposed transversely between the sleeve and the outer body of the thermostatic assembly, said first gasket presenting a cross-section that is substantially rectangular and being provided, on each of its faces extending transversely relative to the longitudinal direction of the actuator sleeve, with a projecting peripheral bulge that essentially occupies the clearance between the actuator sleeve and the outer body.

8. A cartridge according to claim 1, wherein, at the zone where the second channel opens out into the internal volume of the actuator sleeve, the second channel is sealed by a second gasket interposed transversely between the actuator sleeve and the outer body of the thermostatic assembly, said second gasket presenting a cross-section that is substantially rectangular and being associated with a retention element that is fitted against a face of the second gasket extending transversely relative to the longitudinal direction of the actuator sleeve and that essentially occupies the clearance between the actuator sleeve and the outer body.

9. A cartridge according to claim 1, wherein the control assembly comprises two ceramic disks each having one face in moving contact with one face of the other, a first one of these disks being constrained to move with the actuator sleeve and defining first and second passages respectively for the hot and cold fluids, which passages open out respectively into the first and second channels of the actuator sleeve.

10. A cartridge according to claim 9, wherein the cartridge further includes an outer case within which the actuator sleeve is held in its longitudinal direction, with interposed means for sliding in a peripheral direction of the actuator sleeve, and wherein the second one of the two ceramic disks is directly or indirectly constrained to move with the outer case.

11. A mixer tap, wherein the mixer tap is fitted with a thermostatic cartridge in accordance with claim 1.

* * * * *